(12) United States Patent
Rohrs et al.

(10) Patent No.: US 9,531,769 B2
(45) Date of Patent: Dec. 27, 2016

(54) METHODS AND SYSTEM FOR SHARING GADGETS BETWEEN USERS

(71) Applicant: Google Inc., Mountain View, CA (US)

(72) Inventors: Christopher Rohrs, New York, NY (US); Jessica Ewing, San Francisco, CA (US); Rachel Garb, Mountain View, CA (US); Dylan Parker, Victoria (CA)

(73) Assignee: GOOGLE INC., Mountain View, CA (US)

( * ) Notice: Subject to any disclaimer, the term of this patent is extended or adjusted under 35 U.S.C. 154(b) by 395 days.

(21) Appl. No.: 14/037,361

(22) Filed: Sep. 25, 2013

(65) Prior Publication Data

US 2014/0129637 A1    May 8, 2014

Related U.S. Application Data (63) Continuation of application No. 13/682,408, filed on Nov. 20, 2012, now Pat. No. 8,578,004, which is a continuation of application No. 11/647,059, filed on Dec. 27, 2006, now Pat. No. 8,321,537.

(51) Int. Cl.
| | | |
|---|---|---|
| *G06F 15/16* | (2006.01) | |
| *H04L 29/06* | (2006.01) | |
| *G06Q 30/06* | (2012.01) | |
| *G06F 9/54* | (2006.01) | |

(52) U.S. Cl.
CPC ............... *H04L 65/403* (2013.01); *G06F 9/54* (2013.01); *G06Q 30/06* (2013.01)

(58) Field of Classification Search
None
See application file for complete search history.

(56) References Cited

U.S. PATENT DOCUMENTS

| | | |
|---|---|---|
| 7,136,903 B1 | 11/2006 | Phillips et al. |
| 7,958,192 B2 | 6/2011 | Harik et al. |
| 8,145,719 B2 | 3/2012 | Barman et al. |
| 2003/0182210 A1 | 9/2003 | Weitzman et al. |
| 2004/0100496 A1* | 5/2004 | Creasor ............ G06F 17/24 715/748 |
| 2004/0193673 A1 | 9/2004 | Samji et al. |
| 2004/0230663 A1 | 11/2004 | Ackerman |
| 2006/0242238 A1 | 10/2006 | Issa |
| 2007/0078953 A1 | 4/2007 | Chai et al. |
| 2007/0198946 A1 | 8/2007 | Viji et al. |
| 2007/0208802 A1 | 9/2007 | Barman et al. |
| 2008/0052348 A1* | 2/2008 | Adler ............ H04L 67/306 709/203 |
| 2008/0307315 A1 | 12/2008 | Sherman et al. |
| 2009/0100154 A1 | 4/2009 | Stevenson et al. |
| 2010/0114729 A1* | 5/2010 | Chu ............ G06Q 30/0601 705/26.1 |

* cited by examiner

*Primary Examiner* — Brian P Whipple
(74) *Attorney, Agent, or Firm* — Lowenstein Sandler LLP (57) ABSTRACT

One embodiment of the present invention provides a system that facilitates sharing gadgets. The system allows a sender to specify a gadget to share with a recipient and how a set of configuration parameters are to be shared with the recipient. The system further receives an identifier for the recipient. The system also communicates the gadget to the recipient, thereby allowing the recipient to use the gadget in accordance with the configuration parameters.

22 Claims, 7 Drawing Sheets

METHODS AND SYSTEM FOR SHARING GADGETS BETWEEN USERS

CLAIM OF PRIORITY

This is a continuation of U.S. application Ser. No. 13/682,408, filed on Nov. 20, 2012, entitled "Methods and System for Sharing Gadgets Between Users," which is a continuation of application Ser. No. 11/647,059, filed on Dec. 27, 2006, entitled "Methods and System for Sharing Gadgets Between Users," which is now issued as U.S. Pat. No. 8,321,537, all of which are incorporated by reference.

BACKGROUND

1. Field of the Invention

The present invention relates to the design of Web-based applications. More specifically, the present invention relates to a method and system for sharing application modules between users.

2. Related Art

Today's World-Wide Web looks drastically different from when it was first created more than a decade ago. Web sites have evolved from collections of static pages into virtual communities. Popular Web pages are not only a publishing tool, but also a common platform that is driving a new wave of Internet services, such as social networking, blogs, wikis, and other communication tools.

Further fueling the Web's evolution is a new suite of technologies, including the extended markup language (XML) and Web services standards. For instance, a user can select from a library of modular applications, which are often referred to as "gadgets," and can place the selected gadgets on his desktop, personalized homepage, or both. Gadgets typically support a specific function, such as a real-time weather report, a photo album, a live news feed, a stock ticker, a to-do list, a streaming media player, or an instant messenger.

Although the current Web development is increasingly focusing on the collaboration and sharing among users, there is presently no effective way to share a personalized gadget between two users. Such sharing can be valuable, because by re-using configuration information many users can avoid duplicating effort while configuring the gadgets.

Hence, what is needed is a method and system that facilitates sharing of gadgets among multiple users.

SUMMARY

One embodiment of the present invention provides a system that facilitates gadgets sharing. The system allows a sender to specify a gadget to share with a recipient and how a set of configuration parameters are to be shared with the recipient. The system further receives an identifier for the recipient. The system also communicates the gadget to the recipient, thereby allowing the recipient to use the gadget in accordance with the configuration parameters specified by the sender.

In a variation on this embodiment, allowing the sender to specify the gadget includes allowing the sender to select the gadget from one or more gadgets displayed on the sender's homepage, desktop, or both.

In a further variation, allowing the sender to specify the gadget includes allowing the sender to select a gadget template and configure the gadget based on the selected template with sender data.

In a variation on this embodiment, allowing the sender to specify how the set of configuration parameters are to be shared with the recipient includes allowing the sender to share the gadget with the recipient without setting values for the set of configuration parameters.

In a variation on this embodiment, the system allows the sender to set the initial values of the set of configuration parameters.

In a further variation, the system updates the set of configuration parameters for the recipient's gadget based on changes made to the configuration parameters for the sender's gadget.

In a variation on this embodiment, the system allows the recipient to change the configuration parameters for the sender's gadget.

In a variation on this embodiment, communicating the gadget to the recipient includes sending the recipient an identifier for the gadget and an identifier for the set of configuration parameters for the sender's gadget.

In a variation of this embodiment, the system generates a gadget file and applies the set of configuration parameters specified by the sender to the generated gadget file. Furthermore, communicating the gadget to the recipient includes sending an identifier for the generated gadget file.

In a variation of this embodiment, the system communicates the set of configuration parameters to a gadget-file generation server, wherein the gadget-file generation server dynamically generates a gadget file with the set of configuration parameters applied therein. Furthermore, communicating the gadget to the recipient includes sending the recipient an identifier for the dynamically generated gadget file.

In a variation of this embodiment, communicating the gadget to the recipient includes sending the recipient an email, sending the recipient a message via an instant-messaging (IM) mechanism, or displaying a notification on the recipient's homepage, desktop, or both.

In a variation of this embodiment, the system authenticates the recipient prior to allowing the recipient to access the gadget and the set of configuration parameters.

In a variation of this embodiment, communicating the gadget to the recipient includes encrypting, digitally signing, or performing both to a message sent to the recipient.

One embodiment of the present invention provides a system that facilitates receiving a gadget published by a sender. During operation, the system receives a gadget identifier and receives an identifier for a set of configuration parameters for the gadget. The system further obtains the gadget and the set of configuration parameters from a server and applies the configuration parameters to the gadget. Additionally, the system displays the gadget on a recipient's personalized homepage, desktop, or both.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now know or later developed.

Overview

Users can now easily locate, configure, and place modular applications on their personalized homepages or on the desktops. Such modular applications are often referred to as "gadgets" or "widgets" and can be platform-independent. In the following description, "gadget" refers to any application that can be placed on and accessible from a user's personalized homepage or desktop. The terminology "desktop" refers to the main workspace in a graphic user interface such as the WINDOWS® and MACINTOSH® systems, and is not specific to a particular windows-manager or operating system. Additionally, embodiments of the present invention apply not only to personalized homepages and desktops, but also to any user interface which can display gadgets.

Figure 1:
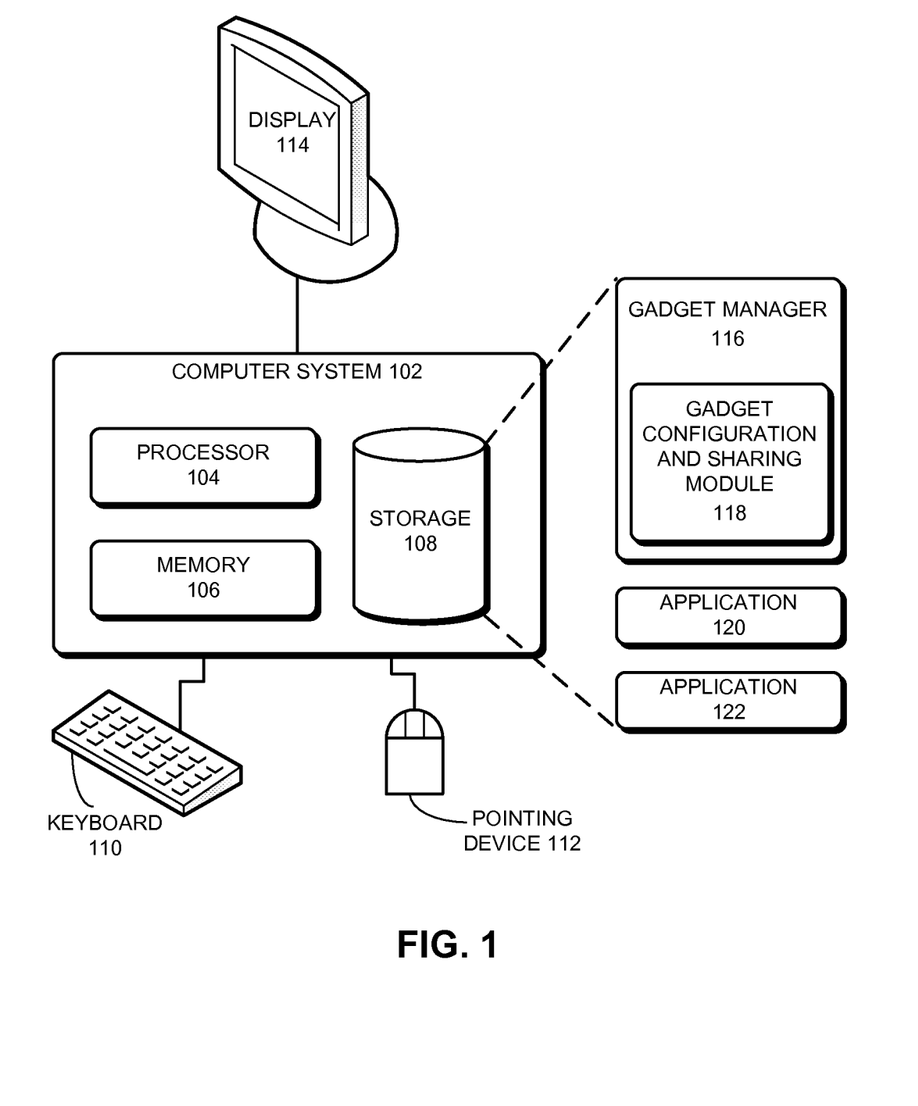
FIG. 1 illustrates an exemplary computer system which facilitates gadget sharing in accordance with one embodiment of the present invention.

Embodiments of the present invention facilitate sharing of personalized or configured gadgets among users, so that a user can publish a gadget to multiple users. FIG. 1 illustrates an exemplary computer system which facilitates gadget sharing in accordance with one embodiment of the present invention. A computer system 102 includes a processor 104, a memory 106, and a storage device 108. Computer system 102 is also coupled to a display 114, a keyboard 110, and a pointing device 112. Storage device 108 stores multiple applications, such as applications 120 and 122. Also stored in storage device 108 is a gadget manager 116, which contains a gadget configuration and sharing module 118. Gadget configuration and sharing module 118 allows a user to select, configure, and share a gadget.

In general, a gadget-sharing scheme involves three aspects: the user interface (UI), the publishing model, and the implementation model. The UI determines how a user can configure and share a gadget. The publishing model determines how much access a recipient has with respect to the configuration information of a shared gadget, which can include personal preferences, data attributes, and any application- or user-related information. The implementation model describes how the underlying information for a gadget is communicated between the sender and the recipient of the shared gadget. The sections below provide more detailed description of these three aspects in conjunction with various embodiments of the present invention.

User Interface

In general, gadget sharing can employ any UI that facilitates access to all the necessary sharing functions to a user. In one embodiment, the UI provides direct access to the sharing functions through the gadgets which are already on display on the user's desktop or personalized homepage.

Figure 2:
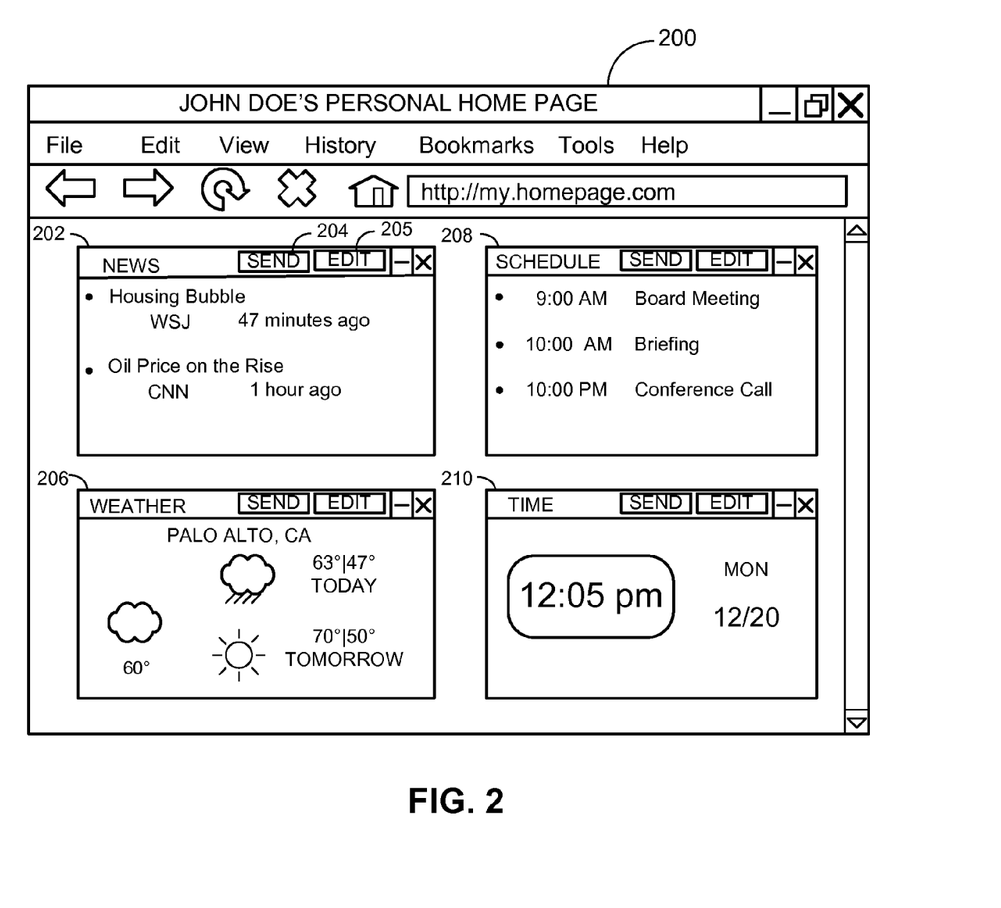
FIG. 2 illustrates an exemplary user interface which allows a user to share a gadget by clicking a link on the gadget in accordance with one embodiment of the present invention.

FIG. 2 illustrates an exemplary user interface which allows a user to share a gadget by clicking a link on the gadget in accordance with one embodiment of the present invention. In this example, multiple gadgets are on display on a personalized homepage 200. Gadget 202 is a real-time news ticker that displays news headlines. Gadget 206 is a real-time weather information center that provides the current and future weather reports. Gadget 208 is a schedule book that reminds the user of tasks to be completed. Gadget 210 is a clock that displays the present time and date.

Note that each gadget displayed on personalized homepage 200 has a "send" button and an "edit" button. For instance, news ticker gadget 202 has a "send" button 204 and an "edit" button 205. The "edit" button allows the user to configure the gadget according to personal preferences. For example, the user can configure news ticker gadget 202 to display only financial and international news. The user can also configure the weather report gadget 206 to display weather information at a different location. Note that other forms of controls to provide the aforementioned functions are also possible. For example, a gadget can present hyperlinks or menu options for the user to access these functions.

The "send" button allows the user to send a gadget with its configuration information to a recipient via email, instant messaging (IM), direct communication to the recipient's homepage or desktop, or any open or proprietary communication channels. For example, when the user clicks "send" button 204, the system prompts the user to enter the recipient's identifier. Note that an identifier can be based on any format that can facilitate identifying a user in a public or private network. Such identifier includes, but is not limited to: an email address, an IM account ID, or an identifier for the recipient's desktop or personalized homepage. After the user inputs such information, information for the gadget is then transmitted to the recipient. Note that the system can optionally send the actual gadget file or a link to the gadget to the recipient. The following sections provide more detailed descriptions of these implementation models.

Figure 3:
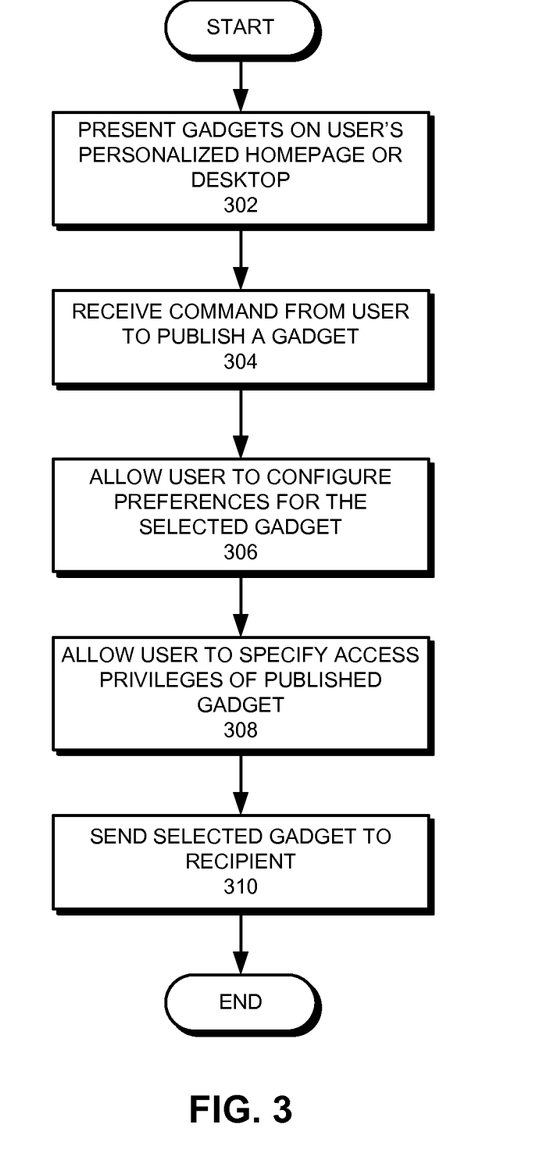
FIG. 3 presents a flow chart illustrating the process of sharing a gadget which is displayed on a user's desktop or personalized homepage in accordance with one embodiment of the present invention.

FIG. 3 presents a flow chart illustrating the process of sharing a gadget which is displayed on a user's desktop or personalized homepage in accordance with one embodiment of the present invention. During operation, the system presents gadgets on the user's personalized homepage or desktop (step 302). After receiving a command from the user to publish a gadget on display (step 304), the system may allow the user to configure the preferences for the selected gadget (step 306). The system may further allow the user to specify the access privileges, such as whether the recipient can view or change the personal preference settings, of the published gadget (step 308). These functions are further discussed in the next section.

Figure 4:
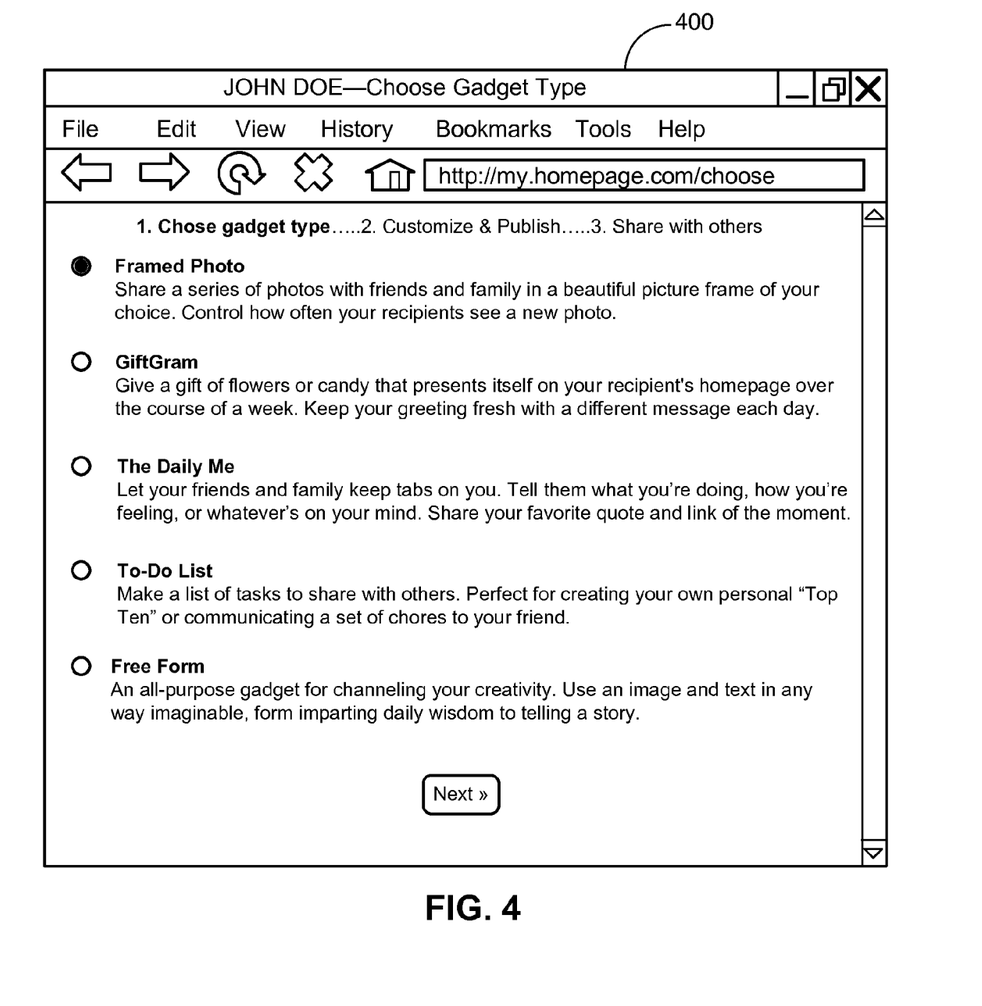
FIG. 4 illustrates an exemplary user interface which allows a user to select a gadget from a list of templates before configuring and sharing the gadget in accordance with one embodiment of the present invention.

In a further embodiment, a user can configure a gadget which is not displayed on his desktop or personalized homepage, and send the newly configured gadget to a recipient. FIG. 4 illustrates an exemplary user interface which allows a user to select a gadget from a list of templates before configuring and sharing the gadget in accordance with one embodiment of the present invention. In this embodiment, the user opens a gadget-sharing wizard displayed in a Web browser window 400 which guides the user through a number of steps for configuring and sending a gadget.

As is shown in FIG. 4, the user first chooses a gadget template from a list of gadget types. Generally, the list can include any gadget templates. Here "template" refers to a gadget that does not have all the configuration information, or has only the initial default values for such information. In a further embodiment, the user can also create a gadget template on his own. In this example, the user can choose from a list of the following gadget templates: "Framed Photo," "GiftGram," "The Daily Me," "To-Do List," and "Free Form." After selecting the "Framed Photo" gadget template, the user proceeds to the next step to configure the gadget.

Figure 5:
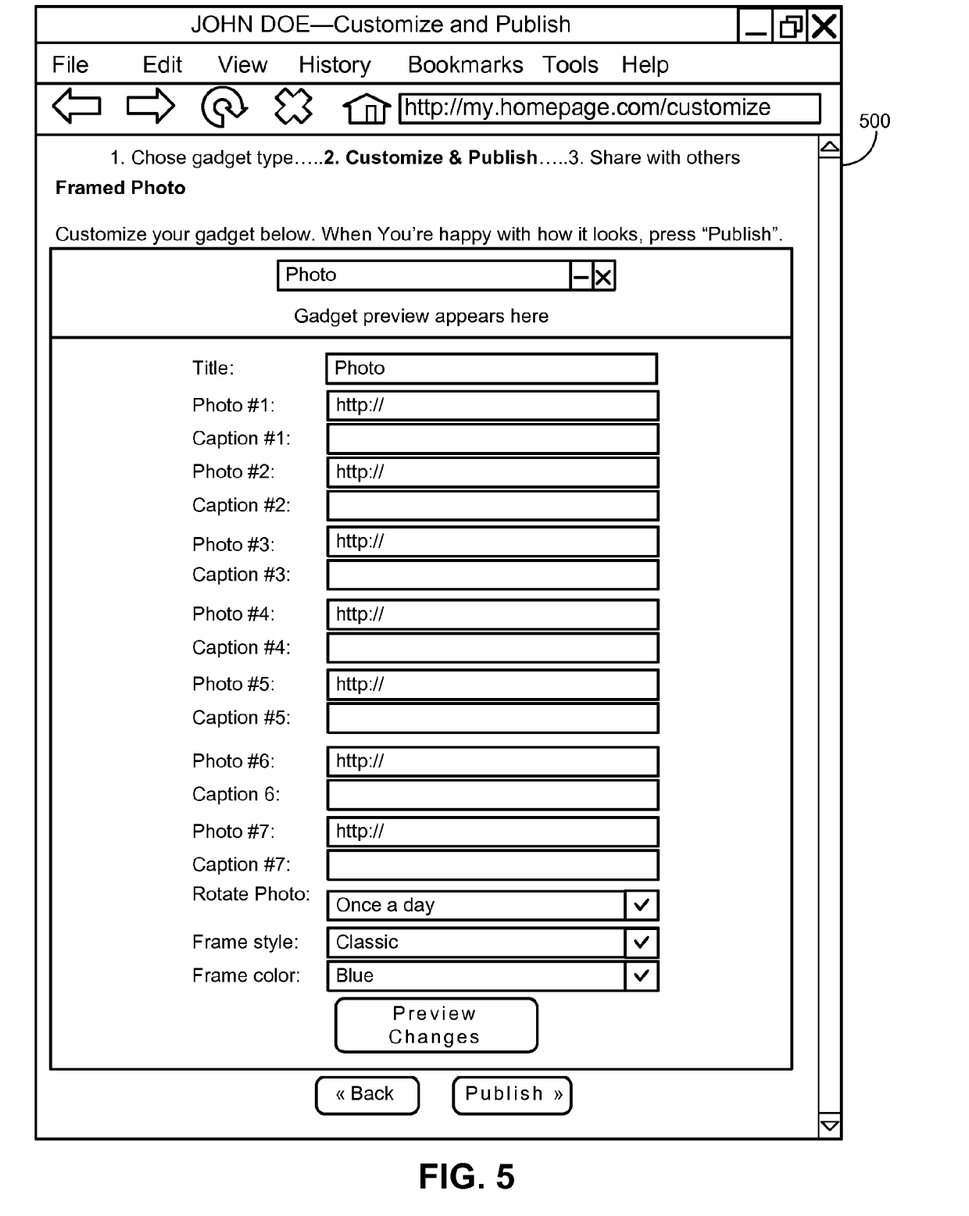
FIG. 5 illustrates an exemplary user interface which allows a user to configure a "Framed Photo" gadget based on a selected template in accordance with one embodiment of the present invention.

FIG. 5 illustrates an exemplary user interface which allows a user to configure a "Framed Photo" gadget based on a selected template in accordance with one embodiment of the present invention. A Web browser window 500 presents a form of fields where the user can enter values for the configuration parameters. In this example, the user is allowed to specify the location of the photos for the "Framed Photo" gadget and label each photo with a caption. Furthermore, the user can specify how frequently the photos rotate. The user is also given the choice of style and color for the photo frame, and can preview the resulting gadget. After configuring the gadget, the user can proceed to the next step to publish the gadget.

Figure 6:
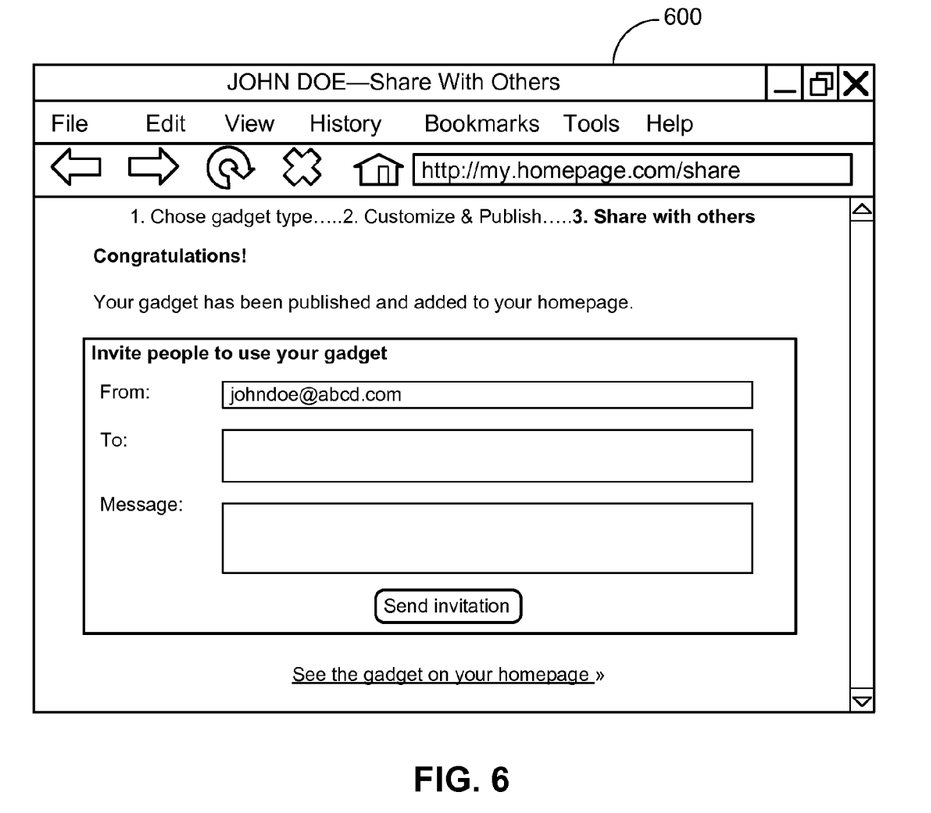
FIG. 6 illustrates an exemplary user interface which allows a user to share a created gadget with another user by email in accordance with one embodiment of the present invention.

FIG. 6 illustrates an exemplary user interface which allows a user to share a created gadget with another user by email in accordance with one embodiment of the present invention. In this step, the user can enter in a Web browser 600 his own email address, the recipient's address, and a short message to accompany the notification to the recipient. Other communication methods, such as IM or direct communications to the recipient's desktop or personalized homepage, can also be employed.

Figure 7:
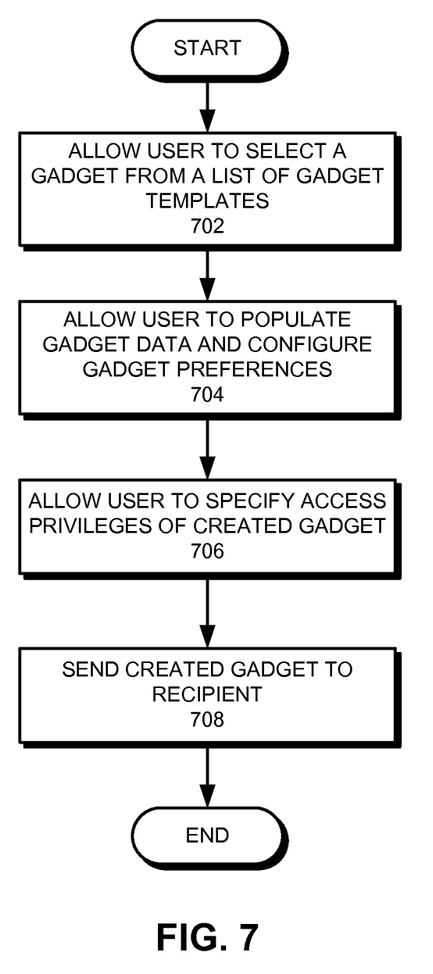
FIG. 7 presents a flow chart illustrating the process of creating a gadget from a template and sharing the created gadget in accordance with one embodiment of the present invention.

FIG. 7 presents a flow chart illustrating the process of creating a gadget from a template and sharing the created gadget in accordance with one embodiment of the present invention. During operation, the system starts by allowing the user to select a gadget from a list of gadget templates (step 702). Next, the system allows the user to populate the gadget template with data and to configure gadget preferences (step 704). The system subsequently allows the user to specify access privileges of the created gadget (step 706). After the user specifies the destination address of the recipient, the system then sends the created gadget to the recipient (step 708).

Publishing Models

Embodiments of the present invention allow a sender to control what contents, for example, the configuration information, the recipient can access with respect to a shared gadget. Without losing generality, the access privileges can be categorized into four groups: no sharing, configuration copying, configuration publishing, and configuration sharing.

No sharing: The recipient receives a "bare-bone" gadget without any personalized configuration values. Hence, the recipient either uses the gadget with its default configuration values, or configures the gadget by hand.

Configuration copying: The sender shares the gadget as well as the configuration information with the recipient. As a result, the recipient receives the gadget as configured by the sender. The sender or recipient can also change the configuration later. However, these changes are not propagated to the other party.

Configuration publishing: The sender shares the gadget as well as the configuration information with the recipient. Furthermore, any changes or updates made subsequently by the sender are also reflected in the recipient's gadget. In one embodiment, the recipient can decide whether to accept the updates. In another embodiment, the recipient can also change the configuration. However, the changes made by the recipient to the gadget are not reflected in the sender's gadget. The sender can configure the gadget so that any subsequent changes made by the sender can override changes made by the recipient. Alternatively, the sender can configure the gadget so that sender's changes may not override recipient's changes if a conflict is present. In a further embodiment, the sender can also turn off the configuration-publishing function, which allows the sender to make changes without publishing these changes to the recipient.

Configuration sharing: The sender shares the gadget as well as the configuration information with the recipient. Furthermore, both the sender and recipient can change the configuration and these changes are propagated to all the users sharing the gadget. That is, any change made by the sender or recipient is broadcast to everyone sharing the gadget. In one embodiment, a sharing user, who can be a sender or a recipient, can decide whether to receive further broadcast changes. In addition, a sharing user can also turn off the configuration-publishing function, which allows the user to make changes without publishing these changes to other users. In a further embodiment, the sharing user can determine which configuration items remain private and which items can be public. That is, the user can selectively withhold certain changes while broadcasting other changes.

The aforementioned publishing models apply not only to one-to-one gadget sharing, but also to one-to-many and many-to-many sharing. In one embodiment, a sharing group can be formed and any member of this group can become a sender or a recipient and can employ any publishing model. A user can decide to join or leave a sharing group at any time. Furthermore, the publishing models or the types of access privileges are not limited to the four groups described above. In general, embodiments of the present invention can employ any customized configuration-sharing schemes.

Implementation Models

Embodiments of the present invention can use a variety of implementation models with respect to how the gadget is communicated to a recipient. The sender can send a file, a link to a file, or a combination of a file and a link to the recipient. Furthermore, the gadget file can be generated by a separate server.

Based on one implementation model, the gadget file to be shared is a static file stored at a server. To share a gadget, the sender sends an identifier for the gadget file to the recipient. In one embodiment, this gadget identifier is a uniform resource identifier (URI). Additionally, the sender's configuration information for the gadget can also be stored on the same or a different server. The sender can send an identifier to the configuration parameters to the recipient, so that the recipient can obtain the gadget as configured by the sender.

For instance, the server hosting the sender's personalized homepage can store the gadget file. To share a configured gadget, the sender sends to the recipient a message that contains a URI to the gadget file on the server, the sender's account ID on the server (which can be optionally encrypted), and an identifier for the gadget on the server. The URI to the gadget file allows the recipient to download the "bare-bone" gadget. The combination of the sender's account ID and the gadget identifier on the server allows the recipient to access the sender's configuration parameters for the gadget. In a further embodiment, the sender can notify the server of the access privileges given to the recipient. To enforce these access privileges, the server authenticates the recipient by, for example, validating the recipient's ID, and applies the corresponding access privileges.

In further embodiments, the sender can enhance the security of the communication by encrypting and/or digitally signing the message sent to the recipient. In this way, the sender can prevent the gadget and the configuration information from being used by eavesdroppers or unauthorized third parties. The sender can also directly send the recipient the configuration information with the URI to the gadget file. Thus, the recipient can download the gadget and apply the received configuration immediately.

Note that the aforementioned implementation model can readily facilitate all the publishing models. In the case where the configuration information is stored on the server, the server allows the sender to make changes, and when the recipient re-opens the shared gadget, the updated configuration parameters are automatically loaded into the recipient's gadget. Similarly, for configuration sharing, the recipient can make changes to the configuration information which is automatically loaded when the sender re-opens his gadget.

In the case where the configuration information is contained in a file directly sent to the recipient, the sender can send another update message which contains the update information to the recipient, so that the recipient can update his gadget. In one embodiment, the sender can configure the gadget so that the update information can be automatically applied to the recipient's gadget. In a further embodiment, the sender can allow the recipient to determine whether to accept the update information. Similarly, the recipient can also send the sender an update message. The sender can configure his gadget to automatically apply the update information, or to let the sender determine whether to apply the update.

Note that the gadget file can be based on any format. The gadget file can be an executable file or a specification file. The gadget file can also be platform specific or platform independent. In one embodiment, the gadget file is an XML file.

In a second implementation model, the sender gathers all the configuration information and provides this information to a gadget-file generation server. The gadget-file generation server then dynamically generates a gadget file based on the data and configuration information sent by the sender, stores this gadget at the server, and returns a URI link for the gadget to the sender. The sender can then send this URI link to the recipient, which allows the recipient to download the configured gadget from the gadget-file generation server. Note that, for updates, the sender can send the updated configuration information to the gadget-file generation server, and the server can re-generate the gadget file with the new configuration. The sender can then notify the recipient that a new version of the gadget is ready for download.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for sharing gadgets, the method comprising:
receiving, by a processor, a request from a sender to share a gadget and a set of configuration parameters with a recipient, the gadget and the set of configuration parameters being selected by the sender, the set of configuration parameters comprising application or user related personal preferences for the gadget, the gadget being an application accessible via a web page;
receiving, by the processor, an identifier for the recipient;
sending, by the processor, the gadget and the set of configuration parameters to the recipient; and
allowing the recipient to access and use the gadget via the web page in accordance with the set of configuration parameters.

2. The method of claim 1, wherein the request from the sender comprises a selection of the gadget from one or more gadgets displayed at least on a homepage or a desktop.

3. The method of claim 1, wherein the request from the sender further comprises:
a gadget template which configures the gadget.

4. The method of claim 1, further comprising:
receiving initial values for the set of configuration parameters.

5. The method of claim 1, further comprising:
updating the set of configuration parameters based on changes made to the set of configuration parameters by the sender.

6. The method of claim 1, further comprising:
receiving changes to the set of configuration parameters from the recipient.

7. The method of claim 1, wherein the sending the gadget to the recipient comprises sending the recipient:
an identifier for the gadget; and
an identifier for the set of configuration parameters.

8. The method of claim 1, further comprising
generating a gadget file; and
applying the set of configuration parameters selected by the sender to the generated gadget file;
wherein the sending the gadget to the recipient comprises sending an identifier for the generated gadget file.

9. The method of claim 1,
wherein the sending the gadget to the recipient comprises sending the set of configuration parameters to a gadget-file generation server, wherein the gadget-file generation server dynamically generates a gadget file and the set of configuration parameters applied therein; and
wherein the sending the gadget to the recipient further comprises sending the recipient an identifier for the dynamically generated gadget file.

10. The method of claim 1, wherein the sending the gadget to the recipient comprises one of:
sending the recipient an email;
sending the recipient a message via an instant-messaging (IM) mechanism; or displaying a notification on at least one of a homepage associated with the recipient, or a desktop.

11. The method of claim 1, further comprising authenticating the recipient prior to allowing the recipient to access the gadget and the set of configuration parameters.

12. The method of claim 1, wherein sending the gadget to the recipient comprises encrypting, or digitally signing, or performing both to a message sent to the recipient.

13. A server, comprising:
a memory storing program instructions; and
a processor operatively coupled to the memory, the processor to execute the program instructions to process requests from senders to send gadgets to recipients, the program instructions, when executed on the processor, cause the processor to:
receive a request from a sender to share a gadget and a set of configuration parameters with a recipient, the gadget and the set of configuration parameters being selected by the sender, the set of configuration parameters comprising application or user related personal preferences for the gadget, the gadget being an application accessible via web page;
receive an identifier for the recipient; and
send the gadget and the set of configuration parameters to the recipient; and
allow the recipient to access the use the gadget via the web page in accordance with the set of configuration parameters.

14. The server of claim 13, further comprising an Internet connection to receive the request, receive the identifier for the recipient, and send the gadget and the set of configuration parameters to the recipient.

15. The server of claim 13, wherein the request from the sender comprises a selection of the gadget from one or more gadgets displayed at least on a homepage or a desktop.

16. The server of claim 13, wherein the request from the sender further comprises a gadget template which configures the gadget.

17. The server of the claim 13, wherein the processor is further to:
receive initial values for the set of configuration parameters.

18. The server of claim 13, wherein the processor is further to:
update the set of configuration parameters based on changes made to the set of configuration parameters by the sender.

19. The server of claim 13, wherein the processor is further to:
receive changes to the set of configuration parameters from the recipient.

20. A non-transitory computer readable medium comprising program instructions that, when executed by a processor, cause the processor to:
receive a request from a sender to share a gadget and a set of configuration parameters with a recipient, the gadget and the set of configuration parameters being selected by the sender, the set of configuration parameters comprising application or user related personal preferences for the gadget, the gadget being an application accessible via a web page;
receive an identifier for the recipient; and
send the gadget and the set of configuration parameters to the recipient; and
allow the recipient to access and use the gadget via the web page in accordance with the set of configuration parameters.

21. The non-transitory computer readable medium of claim 20, wherein the request from the sender comprises a selection of the gadget from one or more gadgets displayed on at least one of a homepage or a desktop.

22. The non-transitory computer readable medium of claim 20, wherein the request from the sender further comprises a gadget template which configures the gadget.

* * * * *